2,760,866

FEEDING RATION PRODUCT

Eugene Nielsen, Minneapolis, Minn.

No Drawing. Application January 21, 1953,
Serial No. 332,510

4 Claims. (Cl. 99—2)

This invention relates to a product and method of making and feeding the same for the purpose of keeping farm animals in good health and particularly for keeping cows in good health and strength and in condition to produce large quantities of milk without physical deterioration.

Much work has been done and much experimental work is continually being performed to get the best results with dairy cattle.

It is an object of this invention to produce a product which will supply all of the required established supplementary minerals for the diet of cattle to keep them in good physical condition and at maximum production.

It is now generally accepted as a fact that during the period of great lactation the normal diet of a cow supplies insufficient minerals so that the cow's system withdraws the needed minerals from the bones. These minerals drawn from the bones are replaced when the cow passes through a period of lesser lactation. It is a further object of this invention therefore to provide a product which will furnish the necessary minerals and to supply these to the cow in the most efficient manner, Various mineral rations have been used and these heretofore have been fed free choice or mixed with various feeds, such as ensilage, hay, and other types of ground feeds, making it necessary to supplement with molasses, sorghum, or other types of appetite additives. It is another object of this invention to provide a product which will dissolve into the drinking water of the animal and thru the medium of the drinking water furnish the animal with its optimal amounts of supplementary minerals.

It is more specifically an object of the invention to produce a ration product comprising substantial and substantially equal parts of ammonium phosphate and sodium phosphate with larger amounts of polyphosphate and several times said amount of commercial phosphoric acid and then mixing said substances in an amount of water of substantially the same weight as said phosphoric acid, in which water comparatively small amounts of copper sulfate, sodium borate, manganese sulfate, zinc sulfate, potassium sulfate, and iron sulfate have been dissolved. Preferably rather minute portions of cobalt sulfate and potassium iodide are also dissolved in said water.

It is still another object of the invention to prepare the product set forth in the preceding paragraph, then adding further water to bring the amount to one standard U. S. fluid ounce and feeding said amount to a cow in substantially 100 pounds of drinking water.

These and other objects will be set forth in the following description:

A product constituting a ration for farm animals and poultry, and particularly for dairy cattle, is produced having as the main constituents thereof dibasic ammonium phosphate, sodium phosphate, sodium polyphosphate, commercial phosphoric acid. Preferably the amount of phosphoric acid is substantially twice as much as the other phosphates. In practice the above mentioned substances are dissolved in water in which comparatively small parts of copper sulfate, sodium borate, manganese sulfate, zinc sulfate, potassium sulfate, and iron sulfate have been dissolved. Preferably rather minute portions of potassium iodide and cobalt sulfate are added.

It will be recognized that the specific amounts of the substances mentioned may be varied somewhat depending on the particular cattle and other conditions. One specific product which has been found to be quite successful is as follows:

|  | Grams |
|---|---|
| 75% commercial food grade phosphoric acid | 1,600 |
| $Na_{12}P_{10}O_{31}$ (sodium polyphosphate) | 500 |
| Dibasic ammonium phosphate—$(NH_4)_2HPO_4$ | 250 |
| $Na_2HPO_4$ | 260 |
| Potassium sulfate—$(K_2SO_4)$ | 12.8 |
| $CoSO_4 \cdot 7H_2O$—cobalt sulfate | 0.912 |
| Copper sulfate—$CuSO_4 \cdot 5H_2O$ | 6.82 |
| KI—potassium iodide | 0.1681 |
| $Na_2B_4O_7 \cdot 10H_2O$—sodium borate | 5.22 |
| Manganese sulfate—$MnSO_4 \cdot H_2O$ | 9.00 |
| $ZnSO_4 \cdot 7H_2O$—zinc sulfate | 5.60 |
| Iron sulfate—$FeSO_4 \cdot 7H_2O$ | 58.00 |

The above chemicals are dissolved in water to produce a solution of exactly one standard U. S. gallon.

Calcium and sodium, commonly found in large proportions in other mineral rations, have been deliberately eliminated from the product because they are very inexpensive and if required by the animal, can more economically be fed free choice.

It has been the general practice in feeding mineral and other rations to cattle to mix the mineral ration with the grain and other ground feed. This mixture is usually moistened somewhat with molasses and other liquid or semi-liquid substances so that it is not entirely dry. Animals, such as dairy cattle, are not particularly fond of such rations and some trouble has been experienced in getting the cattle to eat the same. With the method of feeding the ration in the form just described there is a large element of waste. It is never possible to have the cattle consume all of the product which is placed before them. There is always a certain amount of feed scattered about and remaining. It is impossible as a practical matter to feed the ration in any manner approximating 100 per cent.

In the present invention the product which has been specifically above set forth is further mixed with water to make the amount of said ration constitute one standard U. S. fluid ounce. This fluid ounce which contains the various substances set forth is used as the unit of practice. Such a fluid ounce of the product is preferably placed in 100 pounds of water and fed to one cow as her daily amount of drinking water. With this method the feed is much more attractive to the cow and the natural repugnance of the cattle to the feed is avoided. Furthermore the product is very efficiently fed and practically 100 per cent of the product is taken in by the cow.

The amount of labor necessary in feeding is greatly reduced. The drinking water containing the ration product is delivered to the cow in a drinking device. The labor of distributing the ration into a trough is thus eliminated and any labor used in reclaiming what is left by the cattle is also eliminated. In some previous rations the amount of common salt formed a rather large proportion of the ration. In the present ration no common salt is added to the formula. In many of the present feeds the phosphate is supplied by the use of bone meal. Bone meal is not used in the present product but the phosphates are supplied in soluble salts. Bone meal is objectionable in the ration as when the ration is stored for any considerable period it becomes infected with maggots and other vermin.

From the above description it will be seen that I have provided a novel ration product and a novel and efficient method of feeding the same. The solution of water with the above described product has a low freezing point, so that it can be conveniently handled and fed in cold weather. The feeding of the ration is greatly simplified and is made practically 100 per cent efficient. The product has been amply tested in actual practice and found to be very successful and efficient.

It will of course be understood that various changes may be made in the constituents and proportions of the same used in the product and in the steps and sequence of steps in the method without departing from applicant's invention, which, generally stated, consists in a product capable of carrying out the objects above set forth and in the method as defined in the appended claims.

What is claimed is:

1. A product constituting a feeding ration for farm animals comprising substantially equal parts of ammonium phosphate and sodium phosphate with larger amounts of polyphosphate, and substantially twice as much phosphoric acid as the other phosphates, comparatively small amounts of copper sulfate, sodium borate, manganese sulfate, zinc sulfate, potassium sulfate, and iron sulfate, and finally, minute amounts of cobalt sulfate and potassium iodide.

2. A product constituting a feeding ration for farm animals comprising 1600 grams of 75% commercial food grade phosphoric acid ($H_3PO_4$), 500 grams of sodium polyphosphate ($Na_{12}P_{10}O_{31}$), 250 grams of dibasic ammonium phosphate (($NH_4$)$_2HPO_4$), 260 grams of disodium phosphate ($Na_2HPO_4$), 12.8 grams of potassium sulfate ($K_2SO_4$), 0.912 gram of cobalt sulfate ($CoSO_4 \cdot 7H_2O$)

6.82 grams of copper sulfate ($CuSO_4 \cdot 5H_2O$), 0.1681 gram of potassium iodide (KI), 5.22 grams of sodium borate ($Na_2B_4O_7 \cdot 10H_2O$), 9.00 grams of manganese sulfate ($MnSO_4 \cdot H_2O$), 5.60 grams of zinc sulfate ($ZnSO_4 \cdot 7H_2O$)

58.00 grams of ferrous sulfate, also called iron sulfate ($FeSO_4 \cdot 7H_2O$).

3. The product set forth in claim 2, said substances being in solution in water.

4. A product for a cattle ration comprising substantial parts of ammonium phosphate, sodium phosphate, and sodium polyphosphate, together with approximately twice as much phosphoric acid as the other phosphates, with smaller amounts parts of copper sulfate, sodium borate, manganese sulfate, zinc sulfate, potassium sulfate, a larger part of iron sulfate, and rather minute parts of cobalt sulfate and potassium iodide, all of said substances being dissolved in water.

References Cited in the file of this patent

Morrison: "Feeds and Feeding," 21st ed. (1951), Morrison Pub. Co., Ithaca, N. Y., pages 102, 103, 115–117 and 132.